United States Patent
Atzler (10) Patent No.: US 12,544,754 B2
(45) Date of Patent: Feb. 10, 2026

(54) 3D PRINTING OF ORGANOID PASSAGING PLATE

(71) Applicant: Molecular Devices (Austria) GmbH, Puch bei Hallein (AT)

(72) Inventor: Josef Atzler, Hallein (AT)

(73) Assignee: Molecular Devices (Austria) GmbH (AT)

(*) Notice: Subject to any disclaimer, the term of this patent is extended or adjusted under 35 U.S.C. 154(b) by 184 days.

(21) Appl. No.: 18/098,298

(22) Filed: Jan. 18, 2023

(65) Prior Publication Data

US 2023/0226542 A1     Jul. 20, 2023

Related U.S. Application Data

(60) Provisional application No. 63/300,294, filed on Jan. 18, 2022.

(51) Int. Cl.
*B01L 3/00*     (2006.01)
*B33Y 10/00*     (2015.01)
(Continued)

(52) U.S. Cl.
CPC ......... *B01L 3/502707* (2013.01); *B33Y 80/00* (2014.12); *C12M 21/08* (2013.01);
(Continued)

(58) Field of Classification Search
CPC .......... B01L 3/502707; B01L 2200/12; B01L 2300/0874; B01L 3/5085; B33Y 80/00;
(Continued)

(56) References Cited

U.S. PATENT DOCUMENTS

| 5,962,250 A | 10/1999 | Gavin |
| D420,743 S | 2/2000 | Monks |

(Continued)

FOREIGN PATENT DOCUMENTS

| CN | 111996121 A | 11/2020 |
| DE | 4120303 | 12/1992 |

(Continued)

OTHER PUBLICATIONS

Clinton, James et al., "Initiation Expansion, and Cryopreservation of Human Primary Tissue-Derived Normal and Diseased Organoids in Embedded Three-Dimensional Culture", Current Protocols in Cell Biology, vol. 82, No. 1, Mar. 30, 2019, 22 pages.

(Continued)

*Primary Examiner* — S. Behrooz Ghorishi
(74) *Attorney, Agent, or Firm* — Merchant & Gould P.C.

(57) ABSTRACT

A method of manufacturing a microplate including a plurality of wells includes obtaining an upper portion of the microplate. A bottom surface of the microplate is coated with a bottom surface uncured resin. A sheet material is disposed adjacent a central portion of the bottom surface. A frame is disposed adjacent an edge portion of the bottom surface. The frame contains a frame uncured resin. At least a portion of the bottom surface uncured resin is cured to produce a bottom surface cured resin. At least a portion of the frame uncured resin is cured to produce a frame cured resin. A remaining portion of the bottom surface uncured resin is removed subsequent to curing at least a portion of the bottom surface uncured resin.

10 Claims, 7 Drawing Sheets

(51) Int. Cl.
 B33Y 80/00 (2015.01)
 C12M 3/00 (2006.01)
(52) U.S. Cl.
 CPC ... *B01L 2200/12* (2013.01); *B01L 2300/0874* (2013.01); *B33Y 10/00* (2014.12)
(58) Field of Classification Search
 CPC ....... B33Y 10/00; C12M 21/08; C12M 23/12; C12M 23/20
 See application file for complete search history.

(56) References Cited

U.S. PATENT DOCUMENTS

| | | |
|---|---|---|
| D601,714 S | 10/2009 | Lohn |
| D628,305 S | 11/2010 | Gorrec |
| 8,590,736 B2 | 11/2013 | Motadel |
| D699,371 S | 2/2014 | Williams |
| D745,698 S | 12/2015 | Hage |
| D768,873 S | 10/2016 | Stedman |
| D840,053 S | 2/2019 | Kamees |
| D911,285 S | 2/2021 | Manuel |
| D920,536 S | 5/2021 | Self |
| D954,985 S | 6/2022 | Grayson |
| D956,263 S | 6/2022 | Beckett |
| D968,644 S | 11/2022 | Schatilov |
| 2005/0287573 A1 | 12/2005 | Stafslien et al. |
| 2006/0234370 A1 | 10/2006 | Korpinen et al. |
| 2009/0286317 A1 | 11/2009 | Demmler |
| 2010/0258578 A1 | 10/2010 | Motadel |
| 2014/0322806 A1 | 10/2014 | Bennett et al. |
| 2016/0075985 A1 | 3/2016 | Jung |
| 2017/0276682 A1 | 9/2017 | Park |
| 2018/0142196 A1 | 5/2018 | Coppeta |
| 2019/0249126 A1 | 8/2019 | Mackowiak et al. |
| 2019/0390149 A1 | 12/2019 | Cho |
| 2020/0063081 A1 | 2/2020 | Vulto |
| 2020/0208089 A1 | 7/2020 | Hung |
| 2020/0354668 A1 | 11/2020 | Sawyer |
| 2020/0408695 A1 | 12/2020 | Dragna |
| 2021/0002688 A1 | 1/2021 | Corwin |
| 2021/0069697 A1 | 3/2021 | Azizgolshani |
| 2021/0292707 A1 | 9/2021 | Von Guttenberg et al. |
| 2021/0395658 A1 | 12/2021 | Takahashi |
| 2022/0017846 A1 | 1/2022 | Vulto |
| 2022/0127553 A1 | 4/2022 | Atzler |

FOREIGN PATENT DOCUMENTS

| | | |
|---|---|---|
| DE | 69109651 | 9/1995 |
| DE | 202017003978 | 8/2017 |
| EP | 0094216 | 11/1983 |
| EP | 0359249 | 3/1990 |
| EP | 3124591 | 2/2017 |
| JP | 2012-060903 A | 3/2012 |
| JP | D2011-24238 | 9/2012 |
| KR | 20170142729 | 12/2017 |
| KR | 102127765 | 6/2020 |
| WO | 2015009893 | 1/2015 |
| WO | 2017/198987 | 11/2017 |
| WO | 2017/216113 | 12/2017 |
| WO | 2019/178039 | 9/2019 |
| WO | 2020/013851 | 1/2020 |
| WO | 2020/160678 | 8/2020 |
| WO | 2020/225777 | 11/2020 |
| WO | WO-2023014840 A2 * | 2/2023 |

OTHER PUBLICATIONS

Dumont et al., "Human cell lines for biopharmaceutical manufacturing: history, status, and future perspectives", Critical Reviews in Biotechnology, Nov. 1, 2016; 36(6): 1110-1122.

LeSavage et al., "Next-generation cancer organoids", Nature Materials 21, 143-159 (2022).

Llames, Sara et al., "Feeder Layer Cell Actions and Applications", Tissue Engineering: Part B, vol. 21, No. 4, 2015, 345-353.

Microplates. Online, published date unknown, Retrieved on Apr. 19, 2023 from URL: https://www.fishersci.com/us/en/browse/90111007/microplates?page=1, 1 page.

Thermo Scientific Nunc Microwell 96-Well, Nunclon Delta-Treated, Flat-Bottom Microplate, Online, published date unknown. Retrieved on Apr. 19, 2023 from URL: https://fishersci.com/shop/products/nunc-microwell-96-well-nunclon-delta-treated-flat-bottom-microplate-1/1256626?gclid=CjwKCAjwov6hBhBsEiwArvN6LbM0GGT_, 1 page.

ThermoFisher Scientific, "3D cell culture handbook", 2020, 124 pages.

Yuki, Kanako et al., "Organoid Models of Tumor Immunology", Trends Immunol, Aug. 2020; 41(8):652-664.

* cited by examiner

3D PRINTING OF ORGANOID PASSAGING PLATE

CROSS-REFERENCE TO RELATED APPLICATIONS

This application claims priority from U.S. Provisional Application No. 63/300,294, filed on Jan. 18, 2022, and titled "3D Printing of Organoid Passaging Plate," the contents thereof being incorporated herein by reference in its entirety.

INTRODUCTION

Injection molding, 3D resin printing, and other processes may be used to form products having complex shapes. While each process has certain advantages, disadvantages thereof limit their application in the life science field, for example, in the manufacture of microplates. With regard to injection molding, new molds are required for each microplate configuration, which can make such processes cost-prohibitive. With regard to 3D resin printing, materials available are often not as versatile for environments such as microplates, where organoids are cultured.

SUMMARY

In one aspect, the technology relates to a method of manufacturing a microplate including a plurality of wells, the method includes: obtaining an upper portion of the microplate; coating a bottom surface of the microplate with a bottom surface uncured resin; disposing a sheet material adjacent a central portion of the bottom surface; disposing a frame adjacent an edge portion of the bottom surface, wherein the frame contains a frame uncured resin; curing (1) at least a portion of the bottom surface uncured resin to produce a bottom surface cured resin and (2) at least a portion of the frame uncured resin to produce a frame cured resin; and subsequent to curing at least a portion of the bottom surface uncured resin, removing a remaining portion of the bottom surface uncured resin. In an example, obtaining the upper portion of the microplate includes 3D printing the upper portion of the microplate in a well of uncured resin. In another example, coating a bottom surface of the microplate with the bottom surface uncured resin includes removing the upper portion of the microplate from the well of uncured resin prior to curing a bottommost layer of uncured resin disposed in the well of uncured resin. In yet another example, coating a bottom surface of the microplate with the bottom surface uncured resin includes disposing the upper portion of the microplate in a well of uncured resin. In still another example, curing at least a portion of the bottom surface uncured resin fixes the sheet material to the upper portion of the microplate with the bottom surface cured resin.

In another example of the above aspect, removing the remaining portion of the bottom surface uncured resin exposes a plurality of channels between portions of the bottom surface cured resin. In an example, the plurality of channels fluidically couple at least two adjacent wells of the plurality of wells of the upper portion of the microplate. In another example, the method further includes disposing a film of uncured resin on the sheet material prior to disposing the sheet material adjacent the central portion of the bottom surface. In yet another example, curing at least a portion of the bottom surface uncured resin includes curing at least a portion of the film of uncured resin. In still another example, curing (1) at least a portion of the bottom surface uncured resin and (2) at least a portion of the frame uncured resin includes emitting an ultraviolet light towards the bottom surface uncured resin and the frame uncured resin.

In another example of the above aspect, removing the remaining portion of the bottom surface uncured resin includes rinsing the remaining portion of the bottom surface uncured resin with a rinsing agent repellant to the remaining portion of the bottom surface uncured resin. In an example, a microplate is manufactured.

BRIEF DESCRIPTION OF THE DRAWINGS

The following drawing figures, which form a part of this application, are illustrative of described technology and are not meant to limit the scope of the disclosure as claimed in any manner, which scope shall be based on the claims appended hereto.

DETAILED DESCRIPTION

Figure 1:
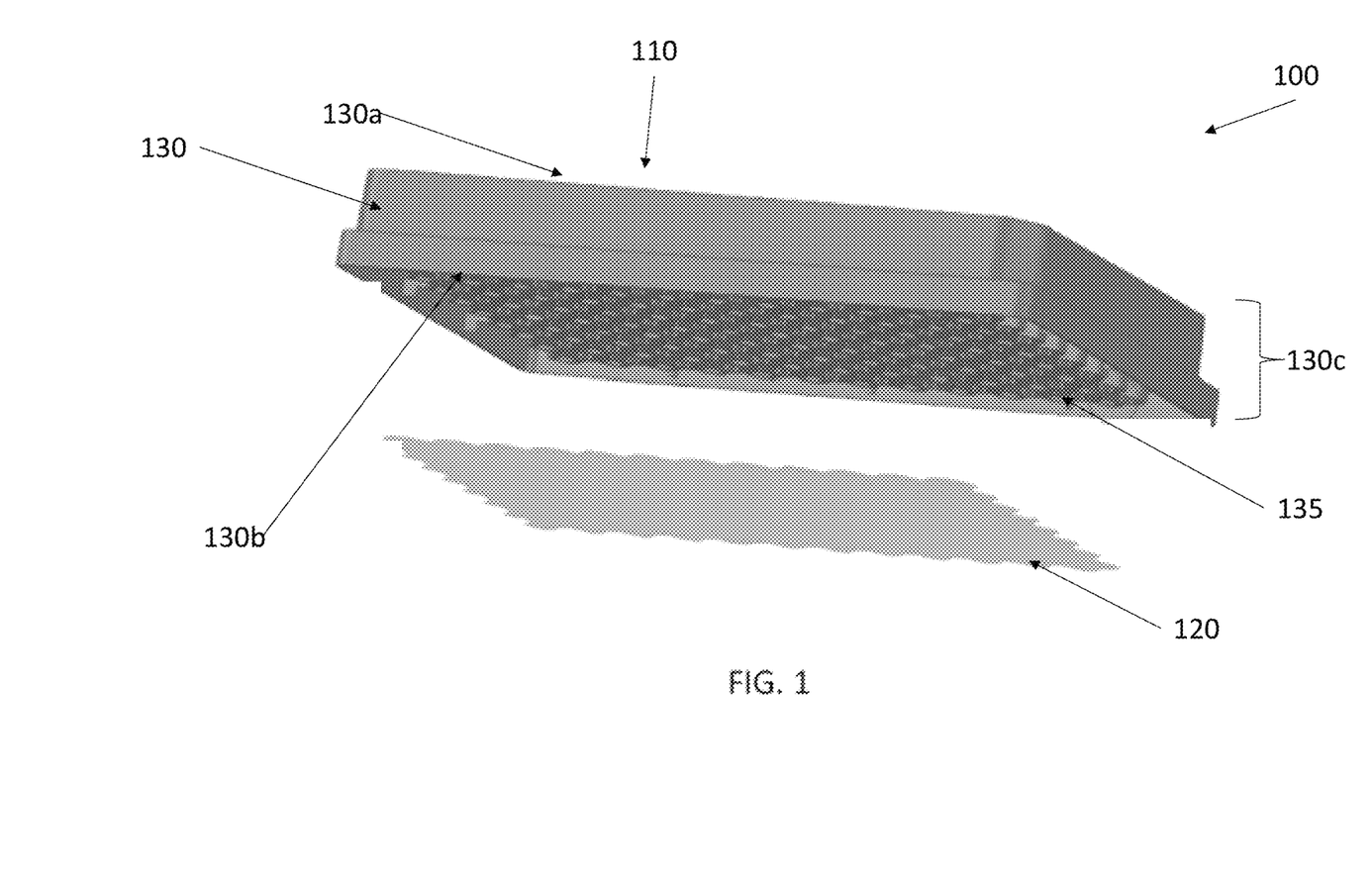
FIG. 1 depicts an exploded perspective view of an organoid microplate, in accordance with various examples of the disclosure.
Figure 2A:
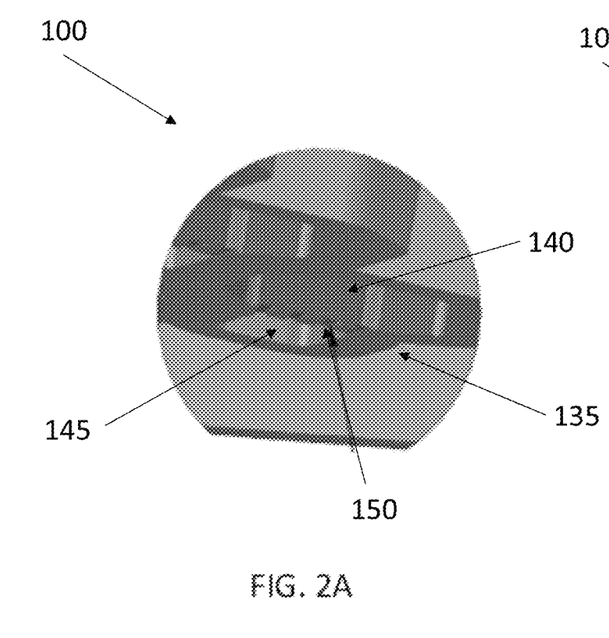
FIGS. 2A and 2B depict partial enlarged perspective and partial enlarged bottom views of a bottom surface of the organoid microplate of FIG. 1.
Figure 2B:
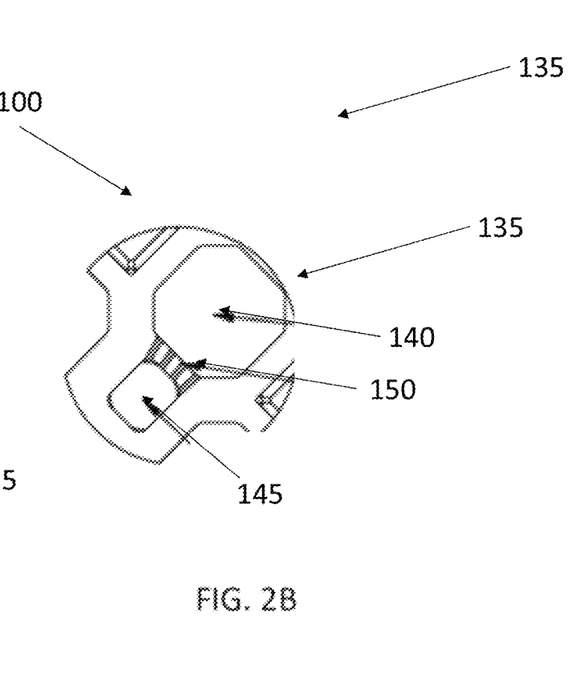

FIG. 1 depicts an exploded perspective view of an organoid microplate 100, in accordance with various examples of the disclosure. FIGS. 2A and 2B depict a partial enlarged perspective and partial enlarged views of a bottom surface of the organoid microplate of FIG. 1. FIGS. 1-2B are described concurrently. In various examples, the organoid microplate 100 includes an upper portion 110 and a base of a sheet material 120. As shown in FIG. 1, the upper portion 110 of the organoid microplate 100 includes a well plate body 130 having a plurality of well units or wells 135 for growing, culturing, monitoring and assaying embryoid bodies, fused embryoid bodies, spheroids, organoids, and/or other multicellular bodies. In various examples, the well plate body 130 includes a material having a top surface 130a, a bottom surface 130b, and a thickness 130c generally corresponding to a desired well height. The components of the well plate body 130 may be formed of any suitable material by any suitable processes. In examples, the well plate body 130 may be formed of polymer, such as a transparent polymer, and/or other material as can be appreciated. For example, the polymer may include polystyrene, polypropylene, poly (methyl methacrylate), cyclic olefin polymer, cyclic olefin copolymer, and/or other polymer as can be appreciated. In examples, acrylonitrile butadiene styrene (ABS) may be utilized. The well plate body 130 may have no removable/moving parts and/or may be formed as a single piece, such as by injection molding or 3D resin printing, such that all of the structures (e.g., wells 135) of the well plate body 130 are formed integrally with one another. The base sheet material 120 may be secured to the bottom surface 130b of the well plate body 130 as described herein. The materials used in the various components of the microplate 100 may be those compatible with each other, and that meet the required or desired performance characteristics of a microplate. The resin used for forming the upper portion 110 of the microplate 100, as well as adhering the sheet material 120 to the bottom surface 130b thereof, displays acceptable adhesion when cured, resistance to flow when uncured, and resistance to liquid seepage from the wells 135. In addition to the above listed materials, other materials would be apparent to a person of skill in the art.

As depicted in greater detail primarily in FIGS. 2A-2B, each well unit 135 may include a primary well section 140, also referred to as a main or culture well 140, and a secondary well section 145, also referred to as a feeding or supply well 145. In various examples, the primary well section 140 and the secondary well section 145 can be fluidly connected with one another to facilitate a gravitational flow of liquid (e.g., feeding medium) between the primary well section 140 and the secondary well section 145 in response to a tilting of the microplate 100. For example, the primary well section 140 and the secondary well section 145 may be fluidly connected with one another via at least one channel 150 that is sized and shaped to facilitate the gravitational flow of liquid between the well sections 140 and 145. Exchanging the media between the primary well section 140 and the secondary well section 145 provides advantages such as, e.g., removing toxic by-products, and supplying the growing cell cultures with fresh nutrients. In other examples, media exchange may be under positive or negative pressure, e.g., from the secondary well section 145.

In examples, the primary well section 140 is sized and shaped to support deposited cell aggregates that may be embedded in hydrogel that is introduced into the primary well section 140. For example, the primary well section 140 may be considered a culture well that is used to grow the embryoid bodies, fused embryoid bodies, spheroids, organoids, and/or other multi-cellular bodies, as can be appreciated. According to various embodiments and dependent upon a number of well units 135 in the microplate 100, such as well units 135 in microplate 100 discussed above with respect to FIG. 1, the width of the primary well section 140 can be up to about 8 millimeters (mm) (e.g., for 96 well plate), up to 11 mm (e.g., for a 48 well plate), up to about 17 mm (e.g., for a 24 well plate), and/or other sizes as can be appreciated. In addition, the depth of the primary well section 140 and the secondary well section 145 may be such that the microplate 100 may be tilted to allow fluid exchange within the well units without spilling the fluid out of the respective primary well section 140 or secondary well section 145 of each the well units.

In various examples, the secondary well section 145 may be used to supply feeding media and/or other nutrients that can be used to feed the growing cell aggregates positioned in the primary well section 140. In addition, the secondary well section 145 can be used to harvest supernatant from the cell aggregates, as can be appreciated. For example, the secondary well section 145 can be considered a supply well that includes the feeding media and/or other nutrients that may be used by the growing cell culture in the primary well section 140. The secondary well section 145 is sized and shaped to hold fluid that can be exchanged with the primary well section 140 according to various embodiments of the present disclosure. According to various embodiments and dependent upon a number of well units 135 in the microplate 100, the width of the secondary well section 145 can be up to about 8 millimeters (mm) (e.g., for 96 well plate), up to 11 mm (e.g., for a 48 well plate), up to about 17 mm (e.g., for a 24 well plate), and/or other sizes as can be appreciated.

In various examples, the size and shape of the primary well section 140 and the secondary well section 145 may differ from one another. In some examples, the primary well section 140 is larger (in a dimension, for example diameter or volume) than the secondary well section 145. In other examples, the secondary well section 145 is larger than the primary well section 140. In some examples, the primary well section 140 includes a shape that differs from a shape of the secondary well section 145. The well units are preferably arrayed in columns and rows as depicted in FIG. 1. In various embodiments, the microplate 100 includes a ninety-size (96) well-style plate comprising 96 primary well sections 140 for cell cultures as can be appreciated. However, it should be noted that the microplate 100 is not limited to a 96 well-style plate and can be organized as a strip, or other type of configuration as can be appreciated.

In various examples, one or more channels 150 may fluidically couple the primary well section 140 with the secondary well section 145. In examples, a single secondary well section 145 may be fluidically coupled to multiple primary well sections 140. To prevent inadvertent exchange of desirable materials (e.g., growing or live organoids) from the primary well section 140 to the secondary well section 145, the channel(s) 150 may be sized so as to prevent such inadvertent exchange. Appropriately sized channel(s) 150 are described further herein.

Figure 3:
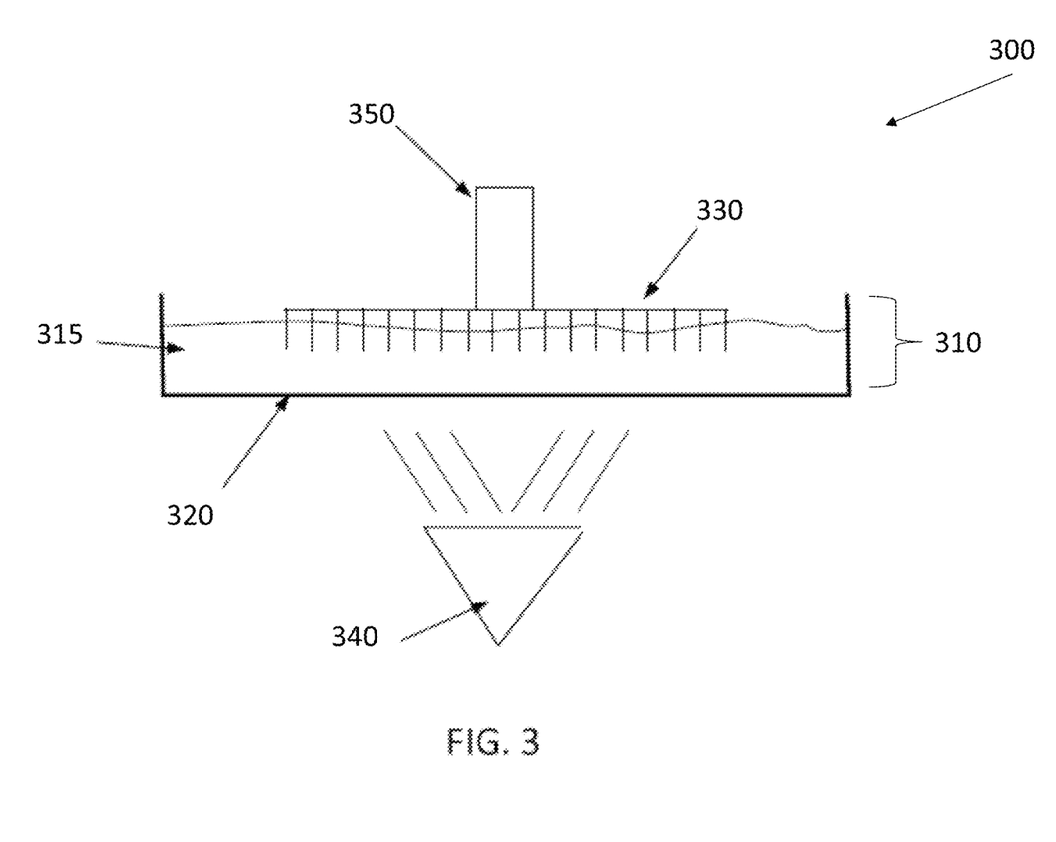
FIG. 3 depicts a system for manufacturing an organoid microplate, in accordance with various examples of the disclosure.

FIG. 3 depicts a system 300 for manufacturing an organoid microplate, in accordance with various examples of the disclosure. The system 300 includes a well 310, which is at least partially filled with an uncured resin 315. A lower portion of the well 310 includes an optical window 320 that may be oxygen-permeable and that may be transparent or partially transparent. In examples, a digital light source or engine 340 is disposed below the window 320, or on an opposite side of the well 310 from the uncured resin 315, and projects light upwards into the well 310 in a predetermined pattern or patterns. As the light contacts the layer of uncured resin 315 closest to the optical window 320, the resin cures. As each successive layer of the resin cures, a build platform 350 at an upper portion 330 of the well 310 lifts in-process component from the resin in an upward direction. This is depicted as the upper portion of the microplate during manufacture. In examples, the system may be a resin-based 3D printing system, such as the Carbon Digital Light Synthesis™ (Carbon DLS™) system, available from Carbon, Inc., of Redwood City, California.

Figure 4A:
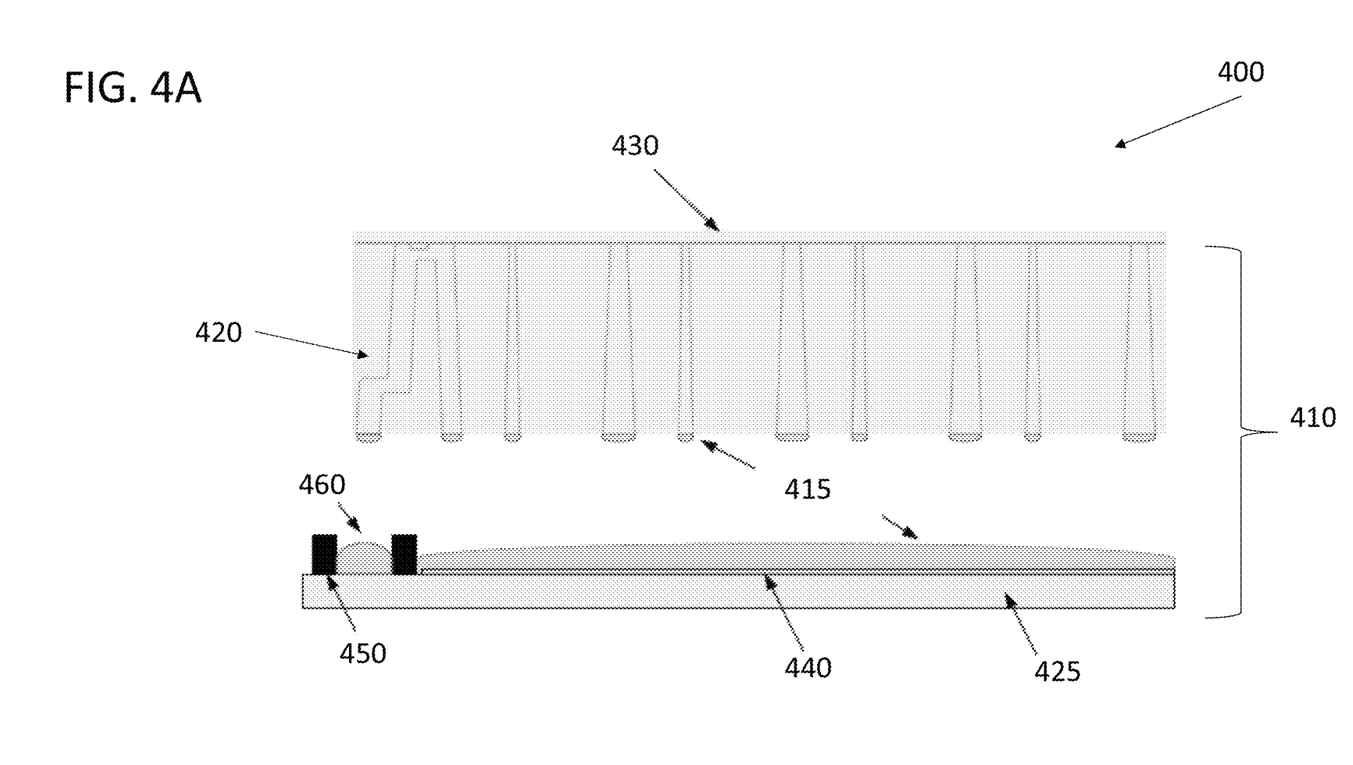
FIGS. 4A-4C depict a method of manufacturing an organoid microplate, in accordance with various examples of the disclosure.
Figure 4B:
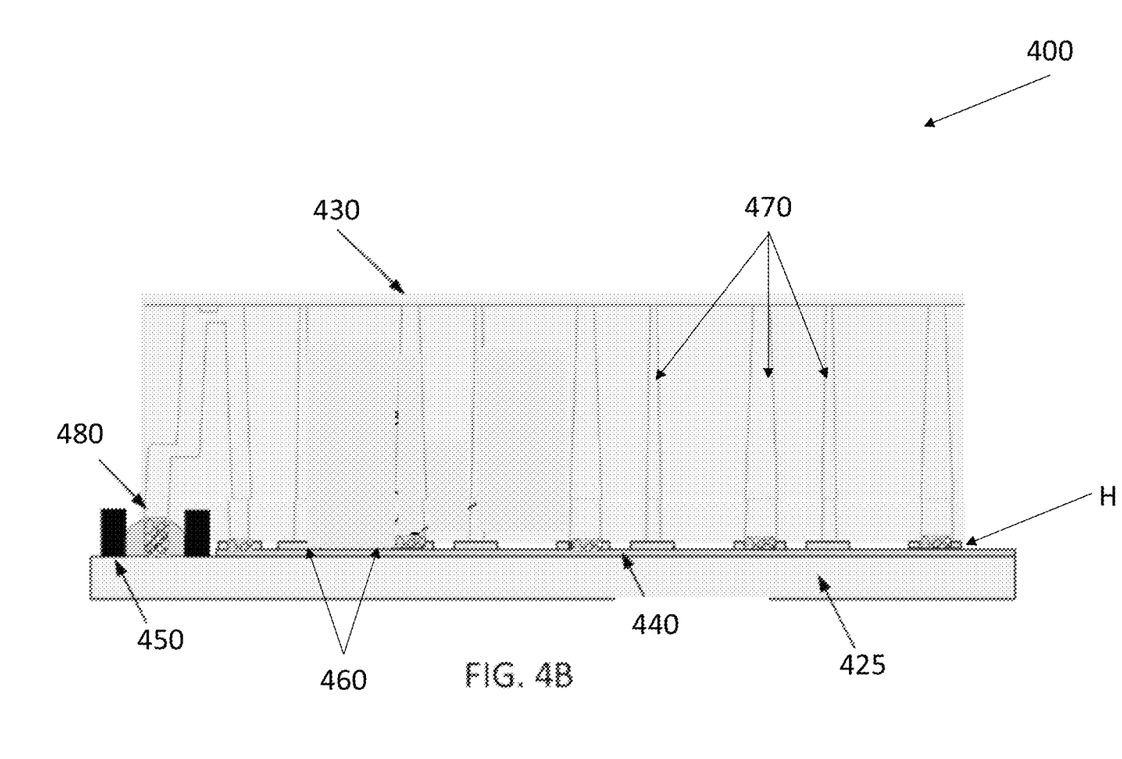
Figure 4C:
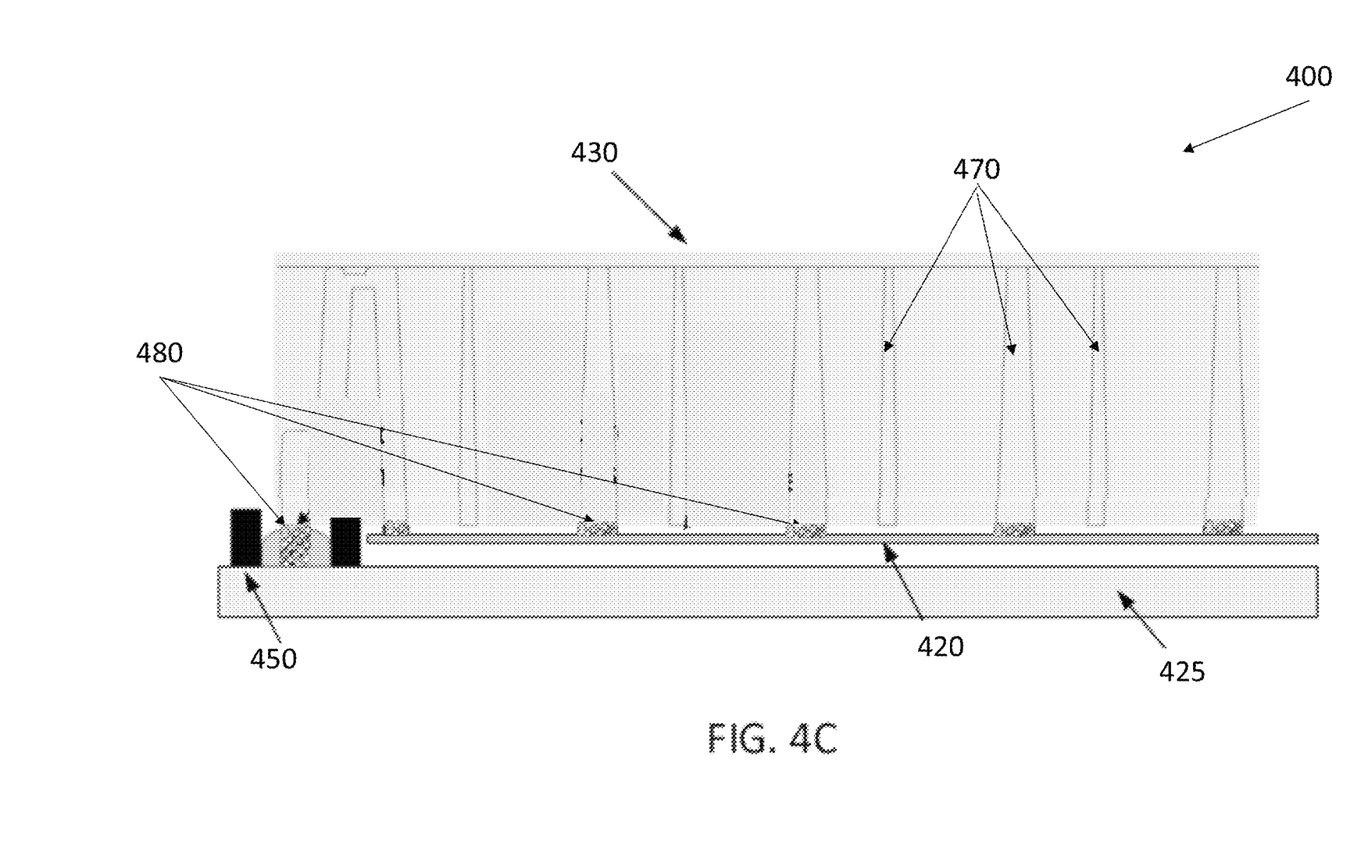

FIGS. 4A-4C depict a method of manufacturing an organoid microplate 400, in accordance with various examples of the disclosure. The method may be performed, in an example, with the system depicted in FIG. 3. An upper portion 430 of the organoid microplate 400 is provided, and the upper portion 430 may be formed in, e.g., the well of uncured resin 315 depicted in FIG. 3, or may be an upper portion formed previously by 3D resin printing or other process (e.g., by injection molding). In examples, if the upper portion 430 was formed in the well of uncured resin, the bottommost layer of resin 415 is not cured by exposure to light energy and is instead removed from the resin in a liquid or substantially liquid form, so as to adhere, via surface tension, to the bottom surface of the formed upper portion 430. For a previously-molded upper portion 430, the upper portion 430 may be dipped or lowered into a well of uncured resin thus leaving a layer of uncured resin 415 thereon. FIG. 4A depicts the upper portion 430 with a bottom layer 415 of uncured resin sticking to the bottommost surface thereof. In various examples, a central portion 420 of the upper portion 430 is disposed adjacent a sheet material 440 that rests on a window 425 that may be similar to the window 320 depicted in FIG. 3. Further, a frame 450 may be disposed proximate an edge portion of the upper portion 430. In examples, the sheet material 440 may be coated with a film of uncured resin 460, and the frame 450 may be at least partially filled with a quantity of uncured resin 460.

In various examples of the disclosure, contact between the upper portion 430 and the sheet material 440 and the frame 450 is depicted in FIG. 4B. Here, the term "contact" does not necessarily mean actual contact; rather, the upper portion 430 is placed in sufficient proximity to the sheet material 440 and to the frame 450 such that further processing (described below) may bind the upper frame 430, the sheet material 440 and the frame 450, with any clearances necessary for robust manufacturing of the microplate, so as to produce channels such as, e.g., channels 470, with sizes as required or desired for a particular application. In examples, channels 470 having heights "H," e.g., between the bottommost surface of the well walls and the sheet material, of about 10 μm, about 15 μm, about 20 μm, about 25 μm, about 30 μm, and about 35 μm are contemplated. In examples, once the upper portion 430 is disposed at the desired distance to the sheet material 440, a light source such as, e.g., the light source 340 of FIG. 3, is energized and light energy passes through the window 425 in the required pattern to cure the desired portions of uncured resin 460, illustrated in the solid lighter color, while the cured resin 480 is illustrated in the cross-hatched pattern. This curing entirely closes off the bottoms of certain well walls and forms channels 470 between others. Subsequent to curing, the microplate 400 may be further processed (e.g., rinsed or washed with a solution repellant to or dissolving of the uncured resin 460) to expose the channels 470 below certain walls and between certain culture and supply wells. This is depicted in FIG. 4C, which illustrates a finished microplate 400.

Figure 5:
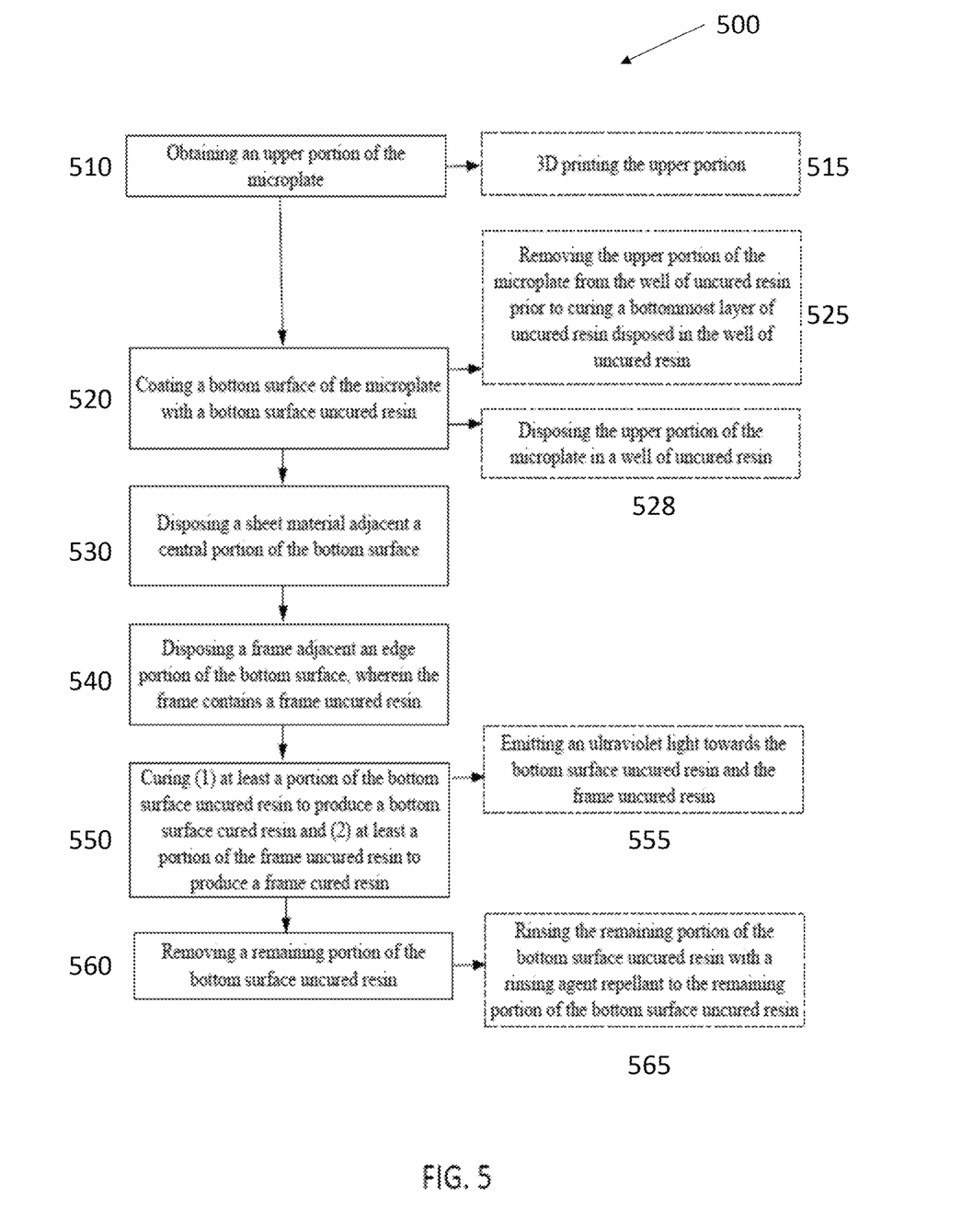
FIG. 5 depicts a method of manufacturing an organoid microplate, in accordance with various examples of the disclosure.

FIG. 5 depicts a method 500 of manufacturing an organoid microplate plate that has a plurality of wells, in accordance with various examples of the disclosure. The method 500 begins with operation 510, which includes obtaining an upper portion of the microplate. In an optional example, operation 510 may include operation 515 of obtaining the upper portion of the microplate by 3D printing the upper portion of the microplate in a well of uncured resin. In other examples, operation 510 may include obtaining the upper portion from a prior process such as injection molding. The method 500 next includes operation 520 of coating a bottom surface of the microplate with a bottom surface uncured resin. In examples, operation 520 may include operation 525 of removing the upper portion of the microplate from the well of uncured resin prior to curing a bottommost layer of uncured resin disposed in the well. Such an example may be relevant when the upper portion is 3D printed in the same resin well. In another example, such as when previously-manufactured upper portions are utilized, operation 520 may include operation 528 of disposing or dipping the upper portion of the microplate in a well of uncured resin.

In examples, the method 500 may further include operation 530 of disposing a sheet material adjacent a central portion of the bottom surface. In an optional examples of operation 530, a film of uncured resin may be disposed or coated on the sheet material prior to disposing the sheet material adjacent the central portion of the bottom surface. Substantially simultaneously or contemporaneously to operation 530, operation 540 includes disposing a frame adjacent an edge portion of the bottom surface. For example, the frame may contain an amount of uncured resin referred to as frame uncured resin.

In examples, the curing operations are performed during operation 550, which includes, in operation 555, emitting an ultraviolet light towards the bottom surface uncured resin and the frame uncured resin, similar to the process used to form the upper portion of the microplate in a 3D resin printing process. In examples, curing operation 550 includes curing at least a portion of the bottom surface uncured resin to produce a bottom surface cured resin. In examples where the sheet material has been coated with a film of uncured resin, operation 550 also includes curing at least a portion of the frame uncured resin. Further, at least a portion of the frame uncured resin is cured to produce a frame cured resin. In examples, curing operation 550 fixes the sheet material to the upper portion of the microplate with the bottom surface cured resin.

In various examples, subsequently to the curing operation(s) 550 and potentially 555, the method 500 continues with operation 560, which includes removing a remaining portion of the bottom surface uncured resin. Operation 560 may include operation 565 of rinsing or washing the remaining portion of the bottom surface uncured resin with a rinsing agent repellant to the remaining portion of the bottom surface uncured resin. In examples, the rinsing or washing during operation 565 exposes a plurality of channels between portions of the bottom surface cured resin. As noted elsewhere herein, these channels fluidically couple at least two adjacent wells of the plurality of wells of the upper portion of the microplate.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method of manufacturing a microplate comprising a plurality of wells, the method comprising:
   obtaining an upper portion of the microplate;
   coating a bottom surface of the microplate with a bottom surface uncured resin;
   disposing a sheet material adjacent a central portion of the bottom surface;

disposing a frame adjacent an edge portion of the bottom surface, wherein the frame contains a frame uncured resin;

curing (1) at least a portion of the bottom surface uncured resin to produce a bottom surface cured resin and (2) at least a portion of the frame uncured resin to produce a frame cured resin; and subsequent to curing at least a portion of the bottom surface uncured resin, removing a remaining portion of the bottom surface uncured resin by rinsing the remaining portion of the bottom surface uncured resin with a rinsing agent repellant to the remaining portion of the bottom surface uncured resin.

2. The method of claim 1, wherein obtaining the upper portion of the microplate comprises 3D printing the upper portion of the microplate in a well of uncured resin.

3. The method of claim 2, wherein coating a bottom surface of the microplate with the bottom surface uncured resin comprises removing the upper portion of the microplate from the well of uncured resin prior to curing a bottommost layer of uncured resin disposed in the well of uncured resin.

4. The method of claim 1, wherein coating a bottom surface of the microplate with the bottom surface uncured resin comprises disposing the upper portion of the microplate in a well of uncured resin.

5. The method of claim 1, wherein curing at least a portion of the bottom surface uncured resin fixes the sheet material to the upper portion of the microplate with the bottom surface cured resin.

6. The method of claim 5, wherein removing the remaining portion of the bottom surface uncured resin exposes a plurality of channels between portions of the bottom surface cured resin.

7. The method of claim 6, wherein the plurality of channels fluidically couple at least two adjacent wells of the plurality of wells of the upper portion of the microplate.

8. The method of claim 1, further comprising disposing a film of uncured resin on the sheet material prior to disposing the sheet material adjacent the central portion of the bottom surface.

9. The method of claim 8, wherein curing at least a portion of the bottom surface uncured resin comprises curing at least a portion of the film of uncured resin.

10. The method of claim 1, wherein curing (1) at least a portion of the bottom surface uncured resin and (2) at least a portion of the frame uncured resin comprises emitting an ultraviolet light towards the bottom surface uncured resin and the frame uncured resin.

* * * * *